(12) United States Patent
Kishima et al.

(10) Patent No.: US 6,842,296 B2
(45) Date of Patent: Jan. 11, 2005

(54) OPTICAL LENS AND METHOD OF PRODUCING THE SAME, METHOD OF PRODUCING OPTICAL LENS ARRAY, FOCUS ERROR SIGNAL PRODUCTION METHOD, AND OPTICAL PICKUP APPARATUS

(75) Inventors: Koichiro Kishima, Kanagawa (JP); Akira Kouchiyama, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/784,797

(22) Filed: Feb. 24, 2004

(65) Prior Publication Data

US 2004/0165279 A1 Aug. 26, 2004

Related U.S. Application Data

(62) Division of application No. 10/052,252, filed on Jan. 23, 2002, now Pat. No. 6,724,544.

(30) Foreign Application Priority Data

Jan. 24, 2001 (JP) ..................................... P2001-015987

(51) Int. Cl.[7] .......................... G02B 3/10; G02B 13/08; G11B 7/00; G11B 7/135
(52) U.S. Cl. .................... 359/721; 359/668; 369/44.23; 369/112.25
(58) Field of Search ................................. 359/623, 624, 359/626, 642, 668, 710, 711, 712, 718, 719, 721; 369/44.23, 112.01, 112.11, 112.12, 112.13, 112.23, 112.25, 112.26

(56) References Cited

U.S. PATENT DOCUMENTS 6,154,434 A * 11/2000 Shibano et al. ......... 369/112.15

* cited by examiner

*Primary Examiner*—Georgia Epps
*Assistant Examiner*—William Choi
(74) *Attorney, Agent, or Firm*—Ronald P. Kananen; Rader, Fishman & Grauer PLLC

(57) ABSTRACT

An optical lens whose focal length is different on first and second planes perpendicular to each other is provided. The optical lens is configured such that a convex element, which is formed integrally with a substrate having a flat face, has a convex curved face that functions as an optical lens and is shape such that the curvature on a first cross section and the curvature on a second cross section perpendicular to and intersecting with the first cross section are different from each other, whereby the focal lengths on the first and second cross sections are different from each other. A groove of a substantially elliptical shape or a substantially rectangular shape is formed along the boundary between the substrate and the convex element. The optical lens is used to produce a focus error signal or is incorporated into an optical pickup apparatus.

6 Claims, 6 Drawing Sheets

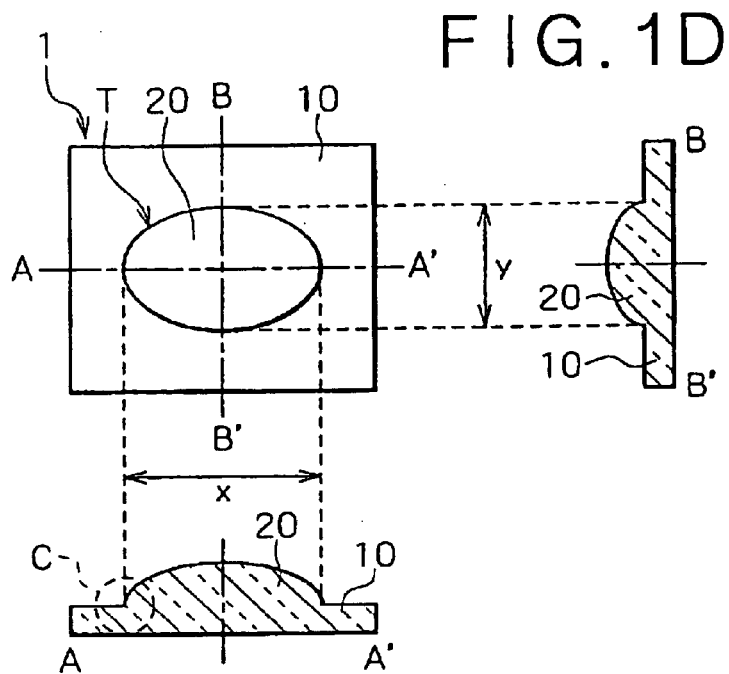
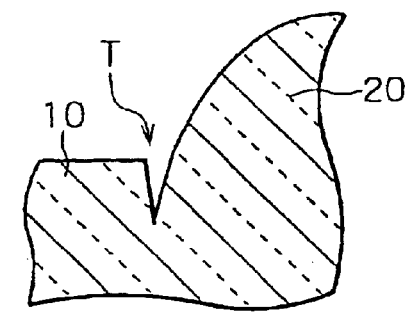

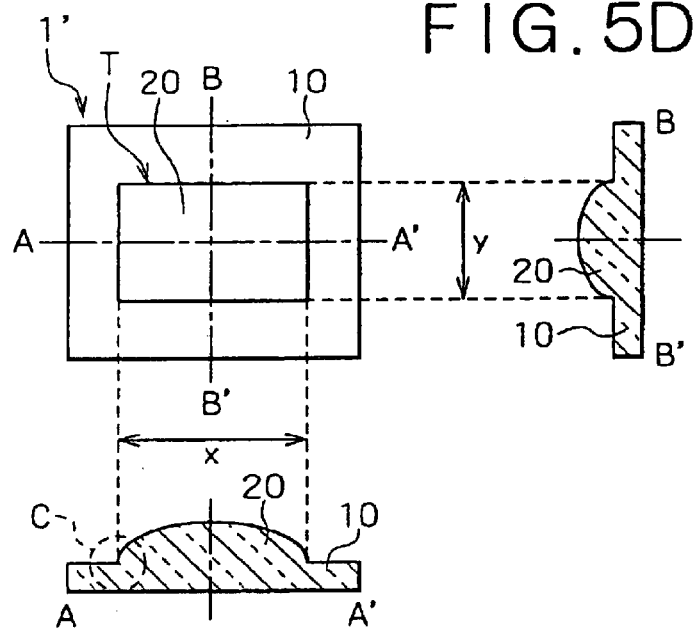
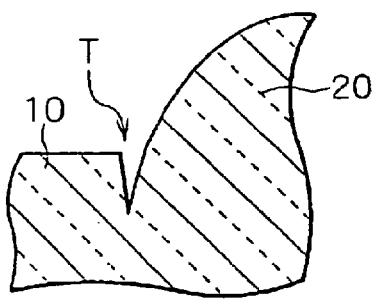
FIG. 5A
FIG. 5B
FIG. 5C
FIG. 5D

OPTICAL LENS AND METHOD OF PRODUCING THE SAME, METHOD OF PRODUCING OPTICAL LENS ARRAY, FOCUS ERROR SIGNAL PRODUCTION METHOD, AND OPTICAL PICKUP APPARATUS

RELATED APPLICATION

This application is a divisional of application Ser. No. 10/052,252, filed on Jan. 23, 2002, now U.S. Pat. No. 6,724,544.

BACKGROUND OF THE INVENTION

This invention relates to an optical lens and a method of producing the same, a method of producing an optical lens array, a focus error signal production method, and an optical pickup apparatus, and more particularly to an optical lens for use with an optical system of an optical disk apparatus or the like, a method of producing the same and a method of producing an optical lens array for use with an optical system of an optical disk apparatus or the like, a focus error signal production method for an optical disk apparatus, and an optical pickup apparatus suitable for use with an optical disk apparatus.

In recent years, in the field of information recording, much effort has been and is being directed to investigations for an optical information recording system. The optical information recording system is advantageous at least in that it allows recording and playback without contact, that it can achieve a recording density higher by one or more digit than that by a magnetic recording system, and that it can be applied to various memory types including the reproduction-only type, the write-once type and the erasable type. Therefore, the optical information recording system is expected as a system which allows realization of a less expensive file of a large capacity and can be used for various applications from industrial applications to consumer applications.

In an optical pickup apparatus incorporated in a recording and/or playback apparatus (hereinafter referred to sometimes as optical disk apparatus) for an optical recording medium (hereinafter referred to sometimes as optical disk) such as a compact disk (CD) or a digital versatile disk (DVD) for such various optical information recording systems as described above, laser light from a laser diode which emits a laser beam of a wavelength of, for example, 780 nm or 650 nm is condensed on an optical recording layer of an optical disk by an optical system including an optical member such as a beam splitter. Reflected light from the optical disk follows a reverse route through the optical system and is projected on a light receiving element such as a photodiode by a multi-lens device.

Information recorded on the optical recording layer of the optical disk is thus read out depending upon the variation of the reflected light from the optical disk.

In the optical pickup apparatus described above, since the distance between an objective lens for condensing the laser light upon the optical recording layer of the optical disk and the optical disk has an influence on the diameter of a spot of the laser light on the optical recording layer, the relative position of the objective lens to the optical disk is adjusted by a focusing servo mechanism.

The focusing servo mechanism detects a focus error signal from the reflected light from the optical disk and moves an electromagnetic actuator, to which the objective lens is secured, based on the resulting focus error signal.

As a method of detecting the focus error signal, an astigmatism method is used widely. According to the astigmatism method, when the reflected light from the optical disk is condensed by an optical lens in order to project the light on a photodiode as a light receiving element, the focal length on a first plane of the optical lens including an axis in a focusing direction and the focal length on a second plane of the optical lens perpendicular to the first plane and intersecting with the first plane along the axis in the focusing direction are made different from each other.

With the astigmatism method, the polarity of the focus error signal differs whether the relative position of the objective lens to the optical disk is relatively far or near, and signals having the opposite polarities can be obtained.

Such an optical lens having different focal lengths on first and second planes perpendicular to each other as described above can be obtained, for example, by combining a cylindrical lens and a circular convex lens or by inserting, into a converging optical system for which a circular convex lens for converging light is used, a flat plate in an inclined relationship to an optical axis of the optical system.

However, the conventional method of realizing an optical system whose focal length is different on the first and second planes perpendicular to each other is disadvantageous in that, since it uses a plurality of optical members, a great number of parts are involved and also a great number of locations where adjustment of a part is required are involved, which makes a factor of raising the production cost. The conventional method is disadvantageous also in that the use of a plurality of optical members makes the light path of the converging optical system long, which makes miniaturization of the optical pickup apparatus difficult.

SUMMARY OF THE INVENTION

It is an object of the present invention to provide an optical lens by which an optical system whose focal length is different on first and second planes perpendicular to each other can be realized by a single optical member and hence with a low cost and which can be used to form a converging optical system of a light path of a reduced length.

It is another object of the present invention to provide a method of producing an optical lens by which an optical system whose focal length is different on first and second planes perpendicular to each other can be realized by a single optical member and hence with a low cost can be produced readily at a low cost.

It is a further aspect of the present invention to provide an optical lens array wherein a plurality of optical lenses described above are arrayed, a focus error signal production method using above-described optical lens, and an optical pickup apparatus which incorporates the optical lens.

In order to attain the objects described above, according to an aspect of the present invention, there is provided an optical lens, including a substrate made of art optical material which has a continuous flat face on a first side through which an axis in a focus direction of the optical lens passes, and a convex element formed integrally with the substrate and having a convex curved face that protrudes from a second side of the substrate opposite from the first side so as to have a function as an optical lens, the curved face of the convex element having a first curvature on a first cross section including an axis in a focus direction of the optical lens and a second curvature on a second cross section perpendicular to the first cross section and intersecting with the first cross section along the axis in the focus direction, the second curvature being different from the first curvature.

Preferably, a focal length of the optical lens on the first cross section and a focal length of the optical lens on the second cross section are different from each other.

Preferably, the shapes of the convex element on the first and second cross sections are symmetrical with respect to the axis in the focus direction.

Preferably, the shapes of the convex element on the first and second cross sections are shapes of arcs substantially of ellipses.

Preferably, the substrate has a flat face on the second side thereof surrounding the convex element.

Preferably, a groove is formed in the second side of the substrate along a boundary between the flat face on the second side of the substrate and the convex element. The groove may have a substantially elliptical shape or substantially rectangular shape.

In the optical lens, the convex element which is formed integrally with the substrate and has a convex curved face so as to have a function as an optical lens is shaped such that the curvature on the first cross section including the axis in the focus direction of the optical lens and the curvature on the second cross section perpendicular to the first cross section and intersecting with the first cross section along the axis in the focus direction are different from each other. Consequently, the focal length on the first cross section and the focal length on the second cross section are different from each other.

Accordingly, an optical system having different focal lengths on first and second planes perpendicular to each other can be realized by a single optical member. Consequently, the production cost of the optical system can be suppressed and the length of the light path of a converging optical system of the optical system can be reduced.

According to another aspect of the present invention, there is provided a method of producing an optical lens, including the steps of forming, on a substrate made of an optical material, a mask layer corresponding to a shape of an optical lens having a pattern whose width in a first direction is different from a width thereof in a second direction perpendicular to the first direction, deforming the mask layer by heat treatment so that a surface area of the mask layer may be reduced, and removing the mask layer and the substrate simultaneously to transfer the shape of the mask layer to the substrate to form the shape of the optical lens.

Preferably, the mask layer is formed by performing a light-exposure and development process for a photosensitive material film to pattern the photosensitive material film. More preferably, in the step of deforming the mask layer by heat treatment so that a surface area of the mask layer may be reduced, the heat treatment is performed at a temperature higher than a glass transition point of the photosensitive material film. Also in the step of deforming the mask layer by heat treatment so that a surface area of the mask layer may be reduced, the heat treatment is performed at a temperature lower than a carbonization temperature of the photosensitive material film.

Preferably, in the step of deforming the mask layer by heat treatment so that a surface area of the mask layer may be reduced, the heat treatment is performed at a temperature higher than a room temperature.

Preferably, in the step of removing the mask layer and the substrate simultaneously, a dry etching process is performed using the mask layer as a mask to transfer the shape of the mask layer to the substrate to form the shape of the optical lens. More preferably, the dry etching process is performed in a condition that selection ratios for the substrate and the mask layer are substantially equal to each other.

According to the method of producing an optical lens, a light-exposure and development process is performed for a photosensitive material film to pattern the photosensitive material film to form, on a substrate made of an optical material, a mask layer corresponding to a shape of an optical lens having a pattern whose width in a first direction is different from a-width thereof in a second direction perpendicular to the first direction.

Then, heat treatment is performed at a temperature lower than a carbonization temperature of the photosensitive material film but higher than a glass transition point of the photosensitive material film and the room temperature so that a surface area of the mask layer may be reduced.

Thereafter, a dry etching process or the like is performed to remove the mask layer and the substrate simultaneously to transfer the shape of the mask layer to the substrate to form-the shape of the optical lens.

With the method of producing an optical lens, an optical lens wherein a convex element which is formed integrally with a substrate and has a convex curved face so as to have a function as an optical lens is shaped such that the curvature on a first cross section including an axis in a focus direction of the optical lens and the curvature on a second cross section perpendicular to the first cross section and intersecting with the first cross section along the axis in the focus direction are different from each other whereby the focal length on the first cross section and the focal length on the second cross section are different from each other can be produced.

With optical lens produced in such a manner as described above, an optical system having different focal lengths on first and second planes perpendicular to each other can be realized by a single optical member. Consequently, the production cost of the optical system can be suppressed and the length of the light path of a converging optical system of the optical system can be reduced.

According to a further aspect of the present invention, there is provided a method of producing an optical lens array, including the steps of forming, on a substrate made of an optical material, a plurality of mask layer portions corresponding to shapes of a plurality of optical lenses each having a pattern whose width in a first direction is different from a width thereof in a second direction perpendicular to the first direction, deforming the mask layer portions by heat treatment so that a surface area of each of the mask layer portions may be reduced, and removing the mask layer portions and the substrate simultaneously to transfer the shapes of the mask layer portions to the substrate to form the shapes of the optical lenses.

According to the method of producing an optical lens array, on a substrate made of an optical material, a plurality of mask layer portions corresponding to shapes of a plurality of optical lenses each having a pattern whose width in a first direction is different from a width thereof in a second direction perpendicular to the first direction are formed.

Then, the mask layer portions are deformed so that a surface area of each of the mask layer portions may be reduced.

Thereafter, the mask layer portions and the substrate are removed simultaneously to transfer the shapes of the mask layer portions to the substrate to form the shapes of the optical lenses.

With the method of producing an optical lens array, an optical lens array wherein a plurality of optical lenses are arrayed and each formed such that a convex element which is formed integrally with a substrate and has a convex curved face so as to have a function as an optical lens is shaped such that the curvature on a first cross section including an axis in a focus direction of the optical lens and the curvature on a second cross section perpendicular to the first cross section and intersecting with the first cross section along the axis in the focus direction are different from each other whereby the focal length on the first cross section and the focal length on the second cross section are different from each other can be produced.

The optical lens array produced in such a manner as described above may be divided into individual optical lenses according to the present invention.

According to a still further aspect of the present invention, there is provided a focus error signal production method for irradiating light upon an optical recording medium to obtain focus information of returning light from the optical recording medium, including the step of obtaining focus information of the returning light from the optical recording medium using an optical lens which includes a substrate made of an optical material and a convex element formed integrally with the substrate and having a convex curved face so as to have a function as an optical lens, the convex element being configured such that a focal length on a first cross section including an axis in a focus direction of the optical lens and a focal length on a second cross section perpendicular to the first cross section and intersecting with the first cross section along the axis in the focus direction are different from each other.

Preferably, the shapes of the convex element on the first and second cross sections of the optical lens are symmetrical with respect to the axis in the focus direction.

Preferably, the shapes of the convex element on the first and second cross sections of the optical lens are shapes of arcs substantially of ellipses.

Preferably, the substrate of the optical lens has a flat face on which the convex element is formed.

Preferably, a groove is formed along a boundary between the substrate and the convex element of the optical lens. Further preferably, the groove of the optical lens has a substantially elliptical shape or a substantially rectangular shape.

According to the focus error signal production method, an optical lens wherein a convex element which is formed integrally with a substrate and has a convex curved face so as to have a function as an optical lens is shaped such that the curvature on a first cross section including an axis in a focus direction of the optical lens and the curvature on a second cross section perpendicular to the first cross section and intersecting with the first cross section along the axis in the focus direction are different from each other whereby the focal length on the first cross section and the focal length on the second cross section are different from each other can be used to converge returning light from the optical recording medium to obtain focus information.

With the focus error signal production method, an optical system for which a plurality of optical members are conventionally required to produce a focus error signal by an astigmatism method can be realized with a single optical member.

According to a yet further aspect of the present invention, there is provided an optical pickup apparatus which irradiates light upon an optical recording medium and receives reflected light from the optical recording medium, including a light emitting element for emitting light, a light receiving element for receiving the light emitted from the light emitting element, and an optical member for introducing the light emitted from the light emitting element so as to be irradiated upon the optical recording medium and introducing the reflected light from the optical recording medium to the light receiving element, the optical member including an optical lens which includes a substrate made of an optical material and a convex element formed integrally with the substrate and having a convex curved face so as to have a function as an optical lens, the convex element being configured such that a focal length on a first cross section including an axis in a focus direction of the optical lens and a focal length on a second cross section perpendicular to the first cross section and intersecting with the first cross section along the axis in the focus direction are different from each other.

Preferably, the shapes of the convex element on the first and second cross sections of the optical lens are symmetrical with respect to the axis in the focus direction.

Preferably, the shapes of the convex element on the first and second cross sections of the optical lens are shapes of arcs substantially of ellipses.

Preferably, the substrate of the optical lens has a flat face on which the convex element is formed.

Preferably, a groove is formed along a boundary between the substrate and the convex element of the optical lens. More preferably, the groove of the optical lens has a substantially elliptical shape or a substantially rectangular shape.

With the optical pickup apparatus, an optical lens wherein a convex element which is formed integrally with a substrate and has a convex curved face so as to have a function as an optical lens is shaped such that the curvature on a first cross section including an axis in a focus direction of the optical lens and the curvature on a second cross section perpendicular to the first cross section and intersecting with the first cross section along the axis in the focus direction are different from each other whereby the focal length on the first cross section and the focal length on the second cross section are different from each other is used. Therefore, an optical system for which a plurality of optical members are conventionally required to produce a focus error signal by an astigmatism method can be realized with a single optical member. Consequently, the production cost can be suppressed and the light path of the converging optical system can be reduced.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1A is a schematic plan view of an optical lens according to the first embodiment;

FIG. 1B is a cross sectional view taken along line A–A' of FIG. 1A;

FIG. 1C is an enlarged cross sectional view of a C portion shown in FIG. 1B;

FIG. 1D is a cross sectional view taken along line B–B' of FIG. 1A;

FIG. 5A is a schematic plan view of an optical lens according to the third embodiment;

FIG. 5B is a cross sectional view taken along line A–A' of FIG. 5A;

FIG. 5C is an enlarged cross sectional view of a C portion in FIG. 5B; and

FIG. 5D is a cross sectional view taken along line B–B' of FIG. 5A.

DETAILED DESCRIPTION OF THE PREFERRED EMBODIMENT

Hereinafter, embodiments of the present invention will be described in further detail with reference to the accompanying drawings.

[First Embodiment]

Referring first to FIGS. 1A to 1D, there is shown an optical lens according to the first embodiment. The optical lens shown is generally denoted by 1 and is made of an optical material such as fused quartz or isotropic silicon oxide. The optical lens 1 has a substrate 10 having a flat surface, and a convex portion 20 provided on the substrate 10 and having a curved surface.

The height of the convex portion 20 of the optical lens 1 is, for example, approximately several hundreds $\mu$m, and the boundary between the convex portion 20 and the substrate 10 has a substantially elliptical shape whose major axis x is approximately 1.0 mm long and whose minor axis y is approximately 0.8 to 0.9 mm long.

In the cross section taken along line A–A' of FIG. 1A and shown in FIG. 1B and the cross section taken along line B–B' of FIG. 1A and shown in FIG. 1D, the surface of the convex portion 20 has a symmetrical shape with respect to the center line indicated by an alternate long and short dash line in FIG. 1B or FIG. 1D.

Further, the surface in each of the cross sections has a shape of an arc substantially of an ellipse, and the radii of curvature of the surface of the convex portion 20 in the cross sections are different by a great amount from each other. More particularly, the radius of curvature of the cross section taken along A–A' of FIG. 1A, that is, the cross section along the major axis, is greater than the radius of curvature of the cross section taken along line B–B' of FIG. 1A, that is, the cross section along the minor axis.

In the optical lens 1 described above, a groove T is formed along the substantially elliptical boundary between the substrate 10 and the convex portion 20 as particularly seen in FIG. 1C.

Since the optical lens 1 has the groove T formed thereon as described above, the position thereof can be confirmed very readily.

Further, since the groove T of the optical lens 1 has a substantially elliptical shape, the optical lens 1 can be positioned further readily.

Also the fact that the convex portion 20 is provided on the substrate 10 which has a flat surface facilitates positioning of the optical lens 1 upon assembly of an optical pickup apparatus or the like.

As described above, the focal length of the optical lens 1 is different in the cross section shown in FIG. 1B and taken along line A–A' of FIG. 1A and the cross section shown in FIG. 1D and taken along line B–B' of FIG. 1A. This is described more particularly with reference to FIGS. 2A to 2D.

Figure 2A:
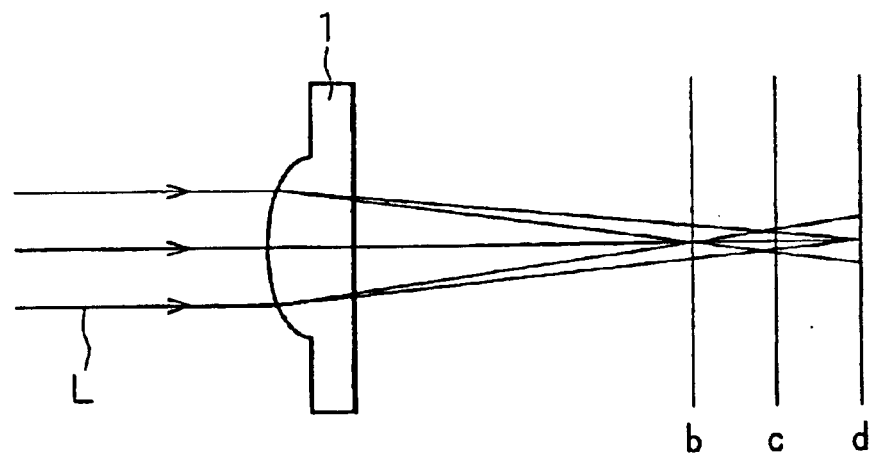
FIGS. 2A, 2B, 2C and 2D are schematic views illustrating the fact that the focal length of the optical lens of FIG. 1A is different between the cross section of FIG. 1B taken along line A–A' of FIG. 1A and the cross section of FIG. 1D taken along line B–B' of FIG. 1A.

For example, if light L substantially in the form of parallel light is introduced into the optical lens 1 as seen in FIG. 2A, then the light L is converged and focused on the emerging side of the optical lens 1.

As described above, the focal lengths on the cross section shown in FIG. 1B and taken along A–A' of FIG. 1A and the focal lengths on the cross section shown in FIG. 1D and taken along B–B' of FIG. 1A are different from each other, and particularly since the cross section taken along line A–A' has a greater radius of curvature, it has a greater focal length while the cross section taken along line B–B' has a smaller focal length since it has a smaller radius of curvature.

Figure 2B:
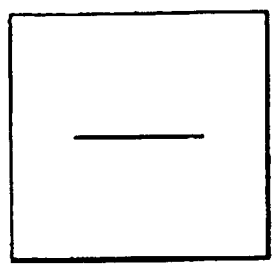
Figure 2C:
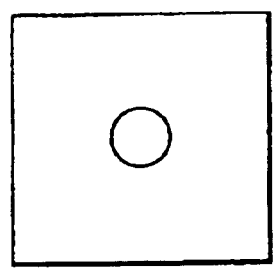

Accordingly, an image in the form of a straight line segment extending in a direction perpendicular to the direction of the B–B' section is formed at a focal position b on a plane of the B–B' section as seen in FIG. 2B.

Figure 2D:
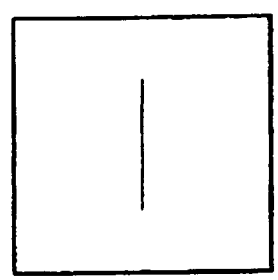

On the other hand, an image in the form of a straight line extending in a direction perpendicular to the direction of the A–A' section is formed at a focal position d on a plane of the A–A' section as seen in FIG. 2D. The image at the focal position d is directed perpendicularly to the image in the form of a straight line segment at the focal position b.

At a middle position c between the focal position b and the focal position d, an image intermediate in transition from one to the other of the two perpendicular images each in the form of a straight line segment, that is, a substantially round image, is formed.

With the optical lens 1 described above, an optical system which has different focal lengths in first and second planes perpendicular to each other can be formed from a single optical member.

Thus, the optical lens 1 can be applied to an optical system for obtaining a focus error signal according to an astigmatism method in an optical pickup apparatus for an optical disk apparatus. Since such an optical system as just described can be realized by a single optical member using the optical lens 1 while a plurality of optical parts are conventionally required, the production cost of the optical system can be suppressed and the length of the light path of a converging optical system of the optical system can be reduced.

A method of producing the optical lens particularly when two or more such optical lenses are formed at a time is described below.

Figure 3A:
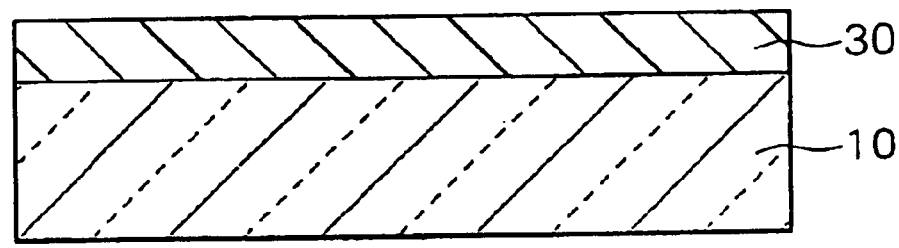
FIG. 3A is a schematic cross sectional view illustrating a process of producing the optical lens of the first embodiment up to a mask layer forming step.

First, as seen in FIG. 3A, a mask layer 30 in the form of a photo-resist film made of a photosensitive material is formed with a predetermined film thickness such as, for example, several tens to several hundreds $\mu$m, for example, by spin coating on a flat surface of a substrate 10 made of an optical material such as fused quartz or isotropic silicon oxide.

Figure 3B:
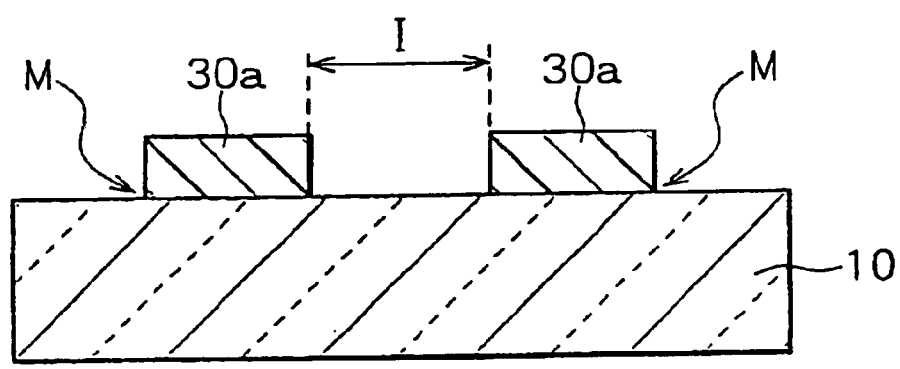
FIG. 3B is a similar view but illustrating the process of producing the optical lens of the first embodiment up to a mask layer pattern working step.

Then, as seen in FIG. 3B, exposure to light and development are performed by a photo-lithography process to form the mask layer 30 into mask layer portions 30a patterned so that the resist film may remain, for example, within an elliptical range whose major axis is 1 mm and whose minor axis is 0.8 to 0.9 mm per formation area for one lens.

Figure 3C:
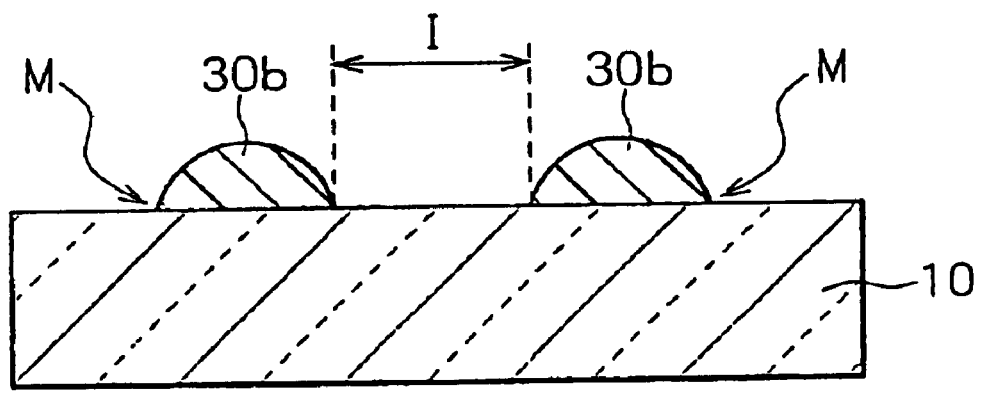
FIG. 3C is a similar view but illustrating the process of producing the optical lens of the first embodiment up to a heat treatment step.

Thereafter, as seen in FIG. 3C, heat treatment, for example, at 150° C. is performed for 30 minutes to deform the mask layer portions 30a so as to reduce the surface area of the mask layer portions 30a thereby to convert the mask layer portions 30a into mask layer portions 30b having such a curved face as to form a surface of an ellipsoid.

Figure 3D:
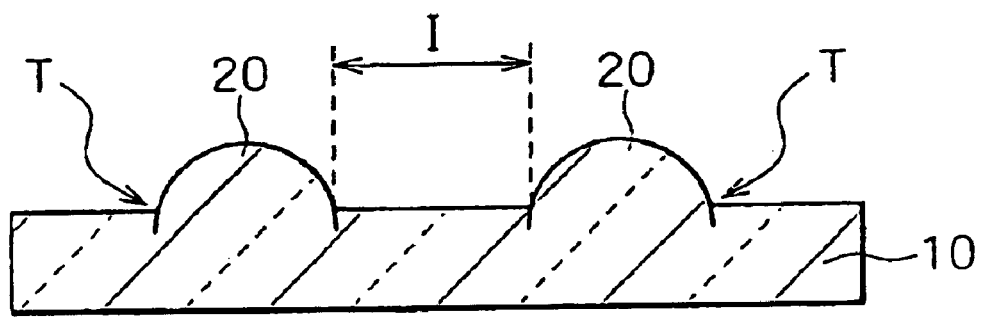
FIG. 3D is a similar view but illustrating the process of producing the optical lens of the first embodiment up to a working step of a lens configuration of a substrate.

Thereafter, as seen in FIG. 3D, the mask layer portions 30b and the substrate 10 are removed simultaneously by a dry etching process by which, for example, the selection ratios for the substrate 10 and the mask layer portions 30b are equal to each other such as, for example, reactive etching (RIE) which uses a plasma etching process using a high density plasma source called NLD (Magnetic Neutral Loop Discharge Plasma) apparatus (refer to, for example, H. Tsuboi, M. Itoh, T. Tanabe, T. Hayashi and T. Uchida: Jpn. J. Appl. Phys. 34 (1995), 2476) thereby to transfer the shape of the mask layer portions 30b to the substrate 10 to form the convex portions 20 which function as optical lenses.

Since the two or more optical lenses are formed in an integrated relationship with each other as described above, they are divided into individual optical lenses in a later step.

In each of the convex portions 20 which are formed in such a manner as described above and each functions as an optical lens, for example, the height is approximately several hundreds μm, and the boundary between the convex portion 20 and the substrate 10 has a substantially elliptical shape whose major axis x is approximately 1.0 mm long and whose minor axis y is approximately 0.8 to 0.9 mm long.

According to the process of producing an optical lens described above, an optical lens whose focal length is different in first and second cross sections perpendicular to each other can be produced.

With the optical lens produced in this manner, an optical system whose focal length is different in first and second cross sections perpendicular to each other can be realized using a single optical member.

For example, the optical lens can be applied to an optical system for obtaining a focus error signal by an astigmatism method in an optical pickup apparatus of an optical disk apparatus. Since such an optical system as just described can be realized by a single optical member while a plurality of optical parts are conventionally required, the production cost of the optical system can be suppressed and the length of the light path of the converging optical system of the optical system can be reduced.

Further, according to the method of producing an optical lens described above, no metal mold is required, and a great number of optical lenses can be produced at a time.

In the working step described hereinabove with reference to FIG. 3D, an NLD apparatus is used as a plasma etching apparatus which employs a high density plasma source. In the present invention, however, it is possible to use a plasma etching apparatus which employs a high density plasma source using not only an NLD apparatus but also an ICP (Inductively Coupled Plasma) apparatus (refer to, for example, J. Hopwood, Plasma Source Sci. & Technol. 1 (1992) 109. or T. Fukasawa, A. Nakamura, H Shindo and Y. Horiike: Jpn. J. Appl. Phys. 33 (1994) 2139) or a like apparatus.

A relationship between the temperature of the heat treatment described above and a glass transition point of a mask layer material (resist film) is described below.

In the process described above, in order to round the surface of a mask layer formed from a photo-resist film or the like to such a degree that it becomes an optically smooth face by heat treatment, preferably the temperature of the heat treatment is set higher than the glass transition point of the mask layer material.

For example, if the temperature of the heat treatment is set higher by more than 40° C. than the glass transition point, then the mask material can be deformed round within one hour. Therefore, high efficiency production can be anticipated.

Further, where it is intended to form a shape of a mask on an optical lens by such a production method as dry etching, since it is required that the mask layer material after heat treatment exhibits no deterioration as described above, the condition that the temperature of the heat treatment must not deteriorate the mask layer material must be satisfied, for example, by setting the heat treatment temperature lower than the carbonization temperature of the mask layer material. If the mask layer material is deteriorated, then the etching rate of the mask material becomes non-uniform, and therefore, when the shape corresponding to the shape of the mask material is transferred to a substrate, the shape is disordered.

For example, if heat treatment is performed at a temperature higher than 200° C., then the mask material is deteriorated (so called sticking). However, if heat treatment is performed, for example, at a temperature within the range from 110 to 150° C., then such deterioration can be eliminated.

Further, if the mask layer is deformed while the substrate is held in a state wherein the mask layer is formed, then the reproducibility of the process is damaged. Therefore, the glass transition point of the mask layer material is preferably higher than the storage temperature (room temperature).

Furthermore, if the mask layer is deformed during the dry etching process, then the reproducibility of the process is damaged. Therefore, the glass transition point of the mask layer material is preferably higher than the working process temperature (a temperature around the room temperature).

Here, in the heat treatment described above, the position of the boundary M between the substrate 10 and each of the mask layer portions 30a and 30b does not exhibit a variation before and after the heat treat as seen from FIGS. 3B and 3C. Accordingly, the position of the boundary M is defined by the photo-mask used upon exposure to light of the mask layer made of a photosensitive material.

The photo-mask for exposure to light is controlled very precisely with respect to the size of the optical lens. Accordingly, the optical lens can be formed at a very precise position.

Meanwhile, the height of the optical lens can be defined by the film thickness of the mask layer material (resist film).

In the dry etching step described above, the groove T is formed along the boundary between the substrate 10 and each convex portion 20.

In the following, a principle of formation of the groove T is described briefly.

Since, in the heat treatment step, the boundary between the substrate and each mask layer portion does not move and the material of the mask layer portion 30b is deformed in such a manner that the surface area thereof decreases, the cross section of the mask layer portion 30b exhibits a substantially elliptical shape. In particular, at a position at which the mask layer portion 30b and the substrate 10 contact with each other, different materials are worked and besides the surface of the mask layer portion 30b has a maximum inclination angle.

Therefore, in the dry etching step, the plasma which contributes to the working becomes discontinuous at the position described above, and consequently, the groove T described above is formed in the substrate 10 in the proximity of the boundary M.

Since the optical lens produced in such a manner as described above has the groove T formed thereon as described above, the position thereof can be confirmed very readily when compared with a conventional optical lens which does not have a groove at a boundary portion but has a smooth curved face.

The optical lens produced in such a manner as described above has a greater range of application because it can be formed with a greater numerical aperture (NA) than that of a conventional optical lens formed by a diffusion process.

Further, while the method of producing an optical lens can be applied to production of a plurality of optical lenses at a time, it can be applied also to production of an optical lens array wherein a plurality of optical lenses are formed in an array on the same substrate. More particularly, an optical lens array wherein a plurality of optical lenses are disposed integrally in an array can be produced if, after a process similar to the process of producing such a plurality of optical lenses as seen in FIG. 3D at a time is completed, the optical lenses are not divided into individual optical lenses.

Where the method of producing an optical lens is applied to production of an optical lens array as described above, the distance between individual ones of the optical lenses is a significant factor in designing. Thus, in the method of producing an optical lens described above, the distance I between the mask layer portions 30a upon pattern formation of the mask layer portions 30a shown in FIG. 3B is kept as the distance I between the mask layer portions 30b each having a surface which has a shape of part of a curved face of a sphere after the heat treatment and further kept as the distance I between the convex portions 20 which are formed by the etching step and each functions as an optical lens.

In other words, the distance between individual optical lenses can be defined by the photo-mask for exposure to light, and therefore, the optical lenses can be formed while the relative positions thereof are controlled with a high degree of precision.

[Second Embodiment]

The optical lens described hereinabove can be applied to a focus error signal production method wherein it is used to obtain a focus error signal by an astigmatism method and also to an optical pickup apparatus incorporated in an optical disk apparatus wherein it is applied to an optical system for obtaining a focus error signal by an astigmatism method.

Figure 4:
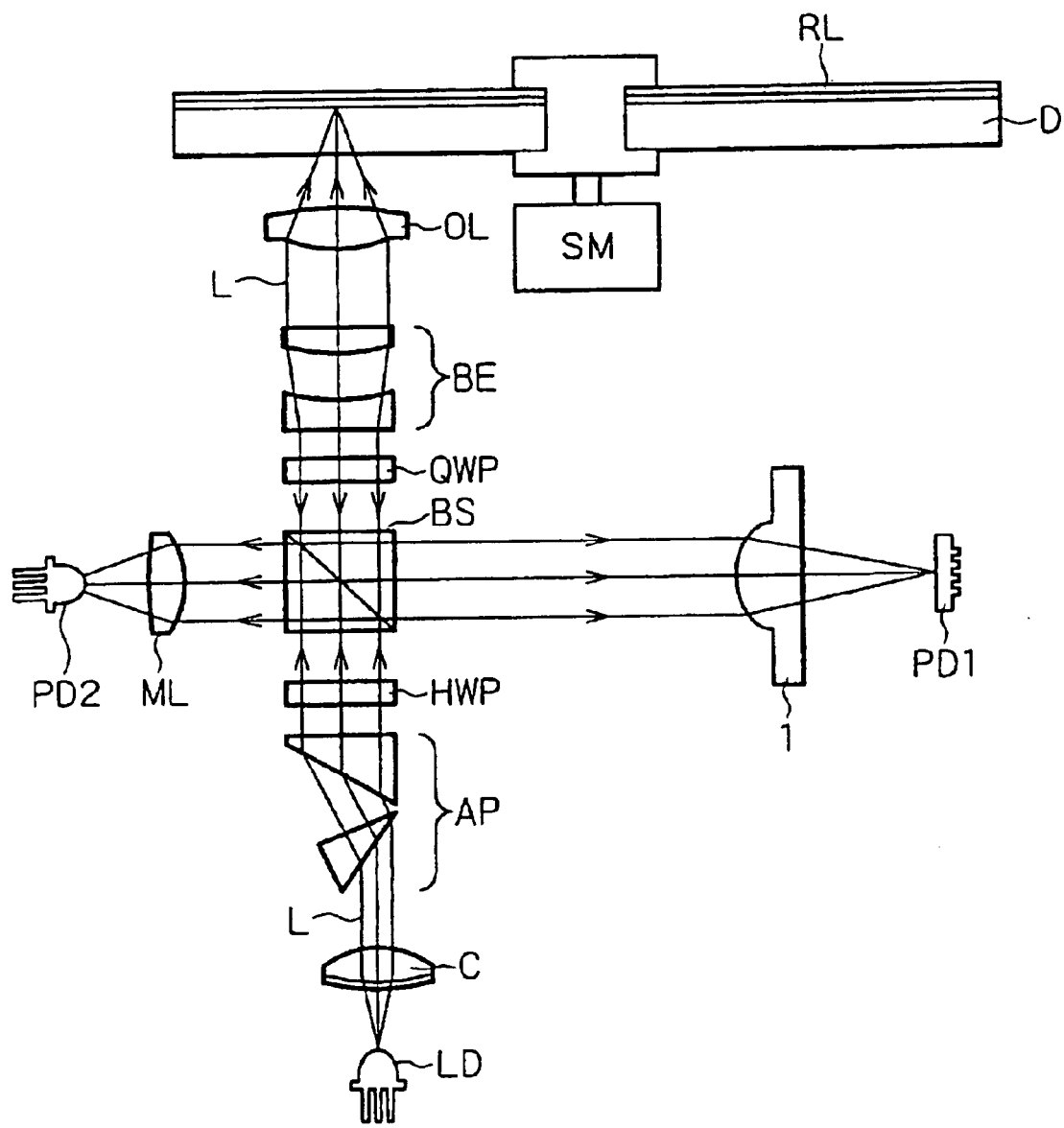
FIG. 4 is a schematic view showing an optical pickup apparatus according to the second embodiment.

FIG. 4 shows a general configuration of an optical pickup apparatus according to the second embodiment.

Referring to FIG. 4, in the optical pickup apparatus shown, a laser diode LD, a collimator C, an anamorphic prism AP, a half wavelength plate HWP, a beam splitter BS, a quarter wavelength plate QWP, a beam expander BE, an objective lens OL, an optical lens 1 whose focal length is different in first and second planes perpendicular to each other, a first photo-diode PD1, a monitor lens ML and a second photo-diode PD2 are disposed at individually predetermined positions with respect to an optical disk D which is driven to rotate by a spindle motor SM.

Laser light L emitted from the laser diode LD is converted into parallel light by the collimator C, successively passes through the anamorphic prism AP and the half wavelength plate HWP and enters the beam splitter BS.

The incoming light partly passes through the beam splitter BS, and then passes through the quarter wavelength plate QWP and the beam expander BE and is condensed by the objective lens OL. The thus condensed light is irradiated upon an optical recording layer RL of the optical disk D which is driven to rotate by the spindle motor SM.

Reflected light from the optical recording layer RL of the optical disk D follows the incoming route but reversely and enters the beam splitter BS. The light is reflected by a light splitting plane of the beam splitter BS and then condensed by the optical lens 1 whose focal length is different on the first and second planes perpendicular to each other, whereafter it is introduced into and measured by the first photo-diode PD1.

Meanwhile, part of the light L emitted from the laser diode LD is reflected by the light splitting plane of the beam splitter BS and then condensed by the monitor lens ML and enters the second photo-diode PD2, by which the intensity of the laser light is monitored.

When the reflected light from the optical recording layer RL of the optical disk D is condensed by the optical lens 1 whose focal length is different on the first and second planes perpendicular to each other, images like straight line segments perpendicular to each other are formed at the smaller focal length position and the greater focal length position whereas, at the middle position between the two focal positions, an image intermediate in transition from one to the other of the two perpendicular images each in the form of a straight line segment, that is, a substantially round image, is formed as described hereinabove in connection with the first embodiment.

Here, if the first photo-diode PD1 is disposed at the middle position between the two focal positions condensed by the optical lens 1 when the optical recording layer RL of the optical disk D is positioned on a focal plane of the objective lens similarly as in a method of producing a focal error signal by an ordinary astigmatism method, then when the optical disk D and the object lens move toward or away from each other, the shape of the beam condensed by the optical lens 1 deforms such that it changes from a circular shape to a straight line shape. Therefore, a focus error signal can be produced by detecting the deformation of the shape of the beam.

With the focusing error signal production method and the optical pickup apparatus described above, since the optical lens 1 whose focal length is different on the first and second planes perpendicular to each other is used to converge returning light from the optical disk to obtain focus information. Therefore, an optical system for which a plurality of optical members are conventionally required to produce a focus error signal by an astigmatism method can be realized with a single optical member.

Consequently, the production cost can be suppressed and the light path of the converging optical system can be reduced, and the optical pickup apparatus can be reduced in size.

Further, where the shape of the optical lens is substantially symmetrical with respect to the first and second planes perpendicular to each other, when a tracking error signal is produced, the signal produced suffers from minimized noise.

[Third Embodiment]

Referring now to FIGS. 5A to 5D, there is shown another optical lens according to the third embodiment. The optical lens shown is generally denoted by 1' and is made of an optical material such as fused quartz or isotropic silicon oxide. The optical lens 1' has a substrate 10 having a flat surface, and a convex portion 20 provided on the substrate 10 and having a curved surface.

The convex portion 20 of the optical lens 1' has a height of, for example, approximately several hundreds $\mu$m, and the boundary between the convex portion 20 and the substrate 10 has a substantially rectangular shape whose long side x is approximately 1.0 mm long and whose short side y is approximately 0.8 to 0.9 mm long.

Except the features described above, the optical lens 1' is substantially similar to the optical lens 1 described hereinabove.

In the cross section taken along line A–A' of FIG. 5A and shown in FIG. 5B and the cross section taken along line B–B' of FIG. 5A and shown in FIG. 5D, the surface of the convex portion 20 has a symmetrical shape with respect to the center line indicated by an alternate long and short dash line in FIG. 5B or FIG. 5D.

Further, the surface in each of the cross sections has a shape of an arc substantially of an ellipse, and the radii of curvature of the surface of the convex portion 20 in the cross sections are different from each other. More particularly, the radius of curvature of the cross section taken along A–A' of FIG. 5A, that is, the cross section along the long side, is greater than the radius of curvature of the cross section taken along line B–B' of FIG. 5A, that is, the cross section along the short side.

In the optical lens 1' described above, a groove T is formed along the substantially rectangular boundary between the substrate 10 and the convex portion 20 as particularly seen in FIG. 5C.

Since the optical lens 1' has the groove T formed thereon as described above, the position thereof can be confirmed very readily.

Further, since the groove T of the optical lens 1' has a substantially rectangular shape, the optical lens 1' can be positioned particularly readily.

Also the fact that the convex portion 20 is provided on the substrate 10 which has a flat surface facilitates positioning of the optical lens 1' upon assembly of an optical pickup apparatus or the like.

As described above, the focal length of the optical lens 1' is different in the cross section shown in FIG. 5B and taken along line A–A' of FIG. 5A and the cross section shown in FIG. 5D and taken along line B–B' of FIG. 5A. Consequently, with the optical lens 1', an optical system which has different focal lengths in first and second cross sections perpendicular to each other can be formed from a single optical member.

Thus, the optical lens 1' can be applied to an optical system for obtaining a focus error signal by an astigmatism method in an optical pickup apparatus for an optical disk apparatus. Since such an optical system as just described can be realized by a single optical member using the optical lens 1' while a plurality of optical parts are conventionally required, the production cost of the optical system can be suppressed and the length of the light path of the converging optical system of the optical system can be reduced.

The optical lens 1' can be formed using a rectangular pattern for a mask in a production process thereof. Thus, mask data can be formed readily.

While preferred embodiments of the present invention have been described using specific terms, the present invention is not limited to the embodiments described above.

For example, the shape of the optical lens may be some other than the shapes described above. For example, the shape of the groove formed on the boundary between the substrate and the convex portion is not limited to an elliptical shape or a rectangular shape but may be a different polygonal shape.

Also the material from which the optical lens is formed and the material of the mask layer are not limited to those described above. Particularly, as the mask layer material, any material can be used in the present invention only if the material does not cause any movement of the boundary with respect to the substrate upon heat treatment and can be worked so as to have a round surface.

Further changes and variations may be made without departing from the spirit or scope of the present invention.

What is claimed is:

1. A focus error signal production method for irradiating light upon an optical recording medium to obtain focus information of returning light from the optical recording medium, comprising the step of:

obtaining focus information of the returning light from the optical recording medium using an optical lens which includes a substrate made of an optical material and a convex element formed integrally with the substrate and having a convex curved face so as to have a function as an optical lens, the convex element being configured such that a focal length on a first cross section including an axis in a focus direction of the optical lens and a focal length on a second cross section perpendicular to the first cross section and intersecting with the first cross section along the axis in the focus direction are different from each other, wherein a groove is formed along a boundary between the substrate and the convex element of the optical lens.

2. The focus error signal production method according to claim 1, wherein the shapes of the convex element on the first and second cross sections of the optical lens are symmetrical with respect to the axis in the focus direction.

3. The focus error signal production method according to claim 1, wherein the shapes of the convex element on the first and second cross sections of the optical lens are shapes of arcs substantially of ellipses.

4. The focus error signal production method according to claim 1, wherein the substrate of the optical lens has a flat face on which the convex element is formed.

5. The focus error signal production method according to claim 1, wherein the groove of the optical lens has a substantially elliptical shape.

6. The focus error signal production method according to claim 1, wherein the groove of the optical lens has a substantially rectangular shape.

* * * * *